UNITED STATES PATENT OFFICE 2,142,590

RUBBER SEALING RING

Joseph Newton Smith, Salem, Mass., assignor to Boston Woven Hose & Rubber Company, Cambridge, Mass., a corporation of Massachusetts Application April 2, 1938, Serial No. 199,651

5 Claims. (Cl. 215—37)

This invention relates to rubber sealing rings for use in sealing preserving jars and other containers where an airtight seal is desirable. Such jars are commonly unsealed by forcing a knife under the cover and into the sealing ring to permit air to enter the jar and break the vacuum, a practice which may result in chipping the jar or injuring the user. To avoid the necessity of employing a sharp instrument, a sealing ring has been provided with an outwardly protruding lip, and unsealing is performed by gripping the lip and pulling it outwardly to thin the ring and allow air to enter the container. Such a ring has not found favor because it is necessary to exert considerable force on the lip in order to thin the ring, inasmuch as sealing rings are generally formed of relatively firm rubber.

My invention consists in providing a sealing ring having an insert of soft rubber disposed in the ring in position to extend across the sealing line between the ring and the jar cover. When the ring is subjected to tension, the strain is localized and the material of the insert flows and thins out across the line of seal, thus allowing air to enter the jar and break the vacuum. Preferably, and as herein shown, the ring may be provided with a protruding lip in an area adjacent to the soft rubber insert for the purpose of facilitating the application of an outward pull to the yielding insert.

An important feature of my invention resides in the fact that the yielding and thinning of the ring is concentrated in a comparatively small area, in contrast to the action of lips formed entirely of the same material as the body of the ring. In the latter type of ring the pull is distributed over a large area and its effectiveness is reduced.

Figure 1:
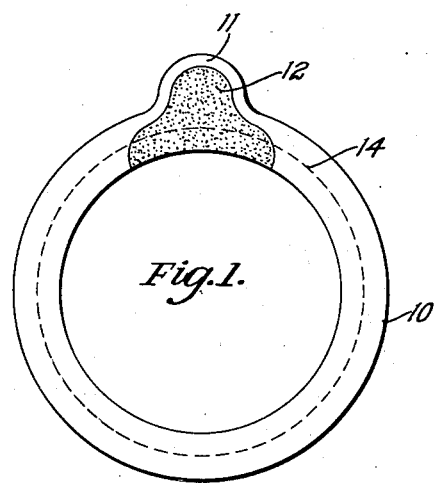
Figure 2:
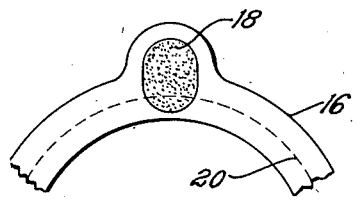
Figure 3:
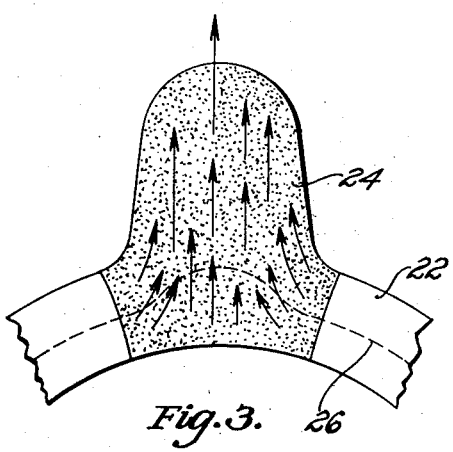
Figure 4:
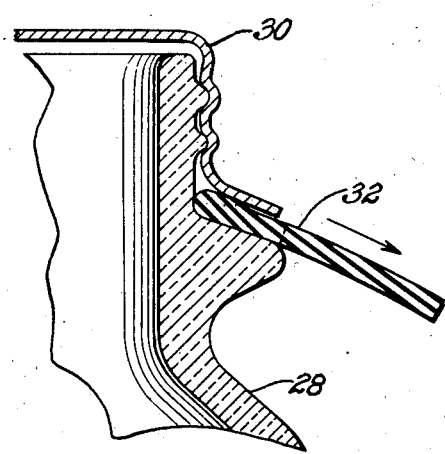

These and other features of my invention will be more easily understood and appreciated from the following description of several preferred embodiments thereof selected for purposes of illustration and shown in the accompanying drawing in which, Fig. 1 is a plan view of a jar ring according to one embodiment of the invention, Fig. 2 is a plan view of another ring embodying the invention, Fig. 3 is a fragmentary plan view on an enlarged scale of a third type of ring, illustrating the flow of the material, and Fig. 4 is a view in cross section of a portion of a jar and a sealing ring in place thereon.

The ring shown in Fig. 1 comprises a flat annulus 10 of relatively firm, commercial rubber stock and a protruding lip 11 integrally formed therewith. The annulus 10 is considerably reduced in width throughout its lip portion, and an insert 12 of relatively soft rubber is disposed in the inside of the reduced portion of the lip 11 and extends flush with the inside edge of the annulus 10 and across the sealing line which is indicated by the dotted line 14. The ring is designed to be clamped between a jar and its cover, the lip protruding enough to present a surface which may be gripped easily, and when the lip 11 and the insert 12 are pulled, the soft rubber of the insert flows and thins out along the sealing line 14.

Another embodiment of the invention is shown in Fig. 2 where the ring is shown as provided with an insert 18 of soft rubber completely enclosed by the firmer material of an annulus 16. The sealing line 70 passes through a portion of the insert 18.

In Fig. 3 a third embodiment of the invention is shown wherein a soft rubber insert 24 forms the entire lip as well as a segment of an annulus 22 formed chiefly of relatively firm rubber stock, the sealing line 26 intersecting the insert 24. The arrows indicate the manner in which the soft rubber of the insert 24 flows and thins out when pulled.

The operation of unsealing a jar provided with a sealing ring of my invention is illustrated in Fig. 4 wherein a soft rubber insert 32 of a ring is disposed between a jar 28 and its cover 30. As pull is exerted in the direction of the arrow, the rubber of the insert 32 flows outwardly and the thickness thereof is reduced. Air is thereby allowed to flow in over the insert to break the vacuum inside the jar 28, and make it possible to unscrew the cover 30.

In all the illustrated embodiments of my invention the soft material of the inserts flows more easily than the relatively stiff rubber of the annuli, therefore the strain is concentrated in the relatively small area of the inserts, and, since the inserts thin out along the sealing line, it is easy to break the vacuum. It will be apparent to those skilled in the art that there are a great number of possible variations from the illustrated embodiments of my invention. However, the requirements of the problem are met as long as provision is made for an insert which extends across the sealing line in association with a gripping surface upon which a pull may be exerted to reduce the thickness of the insert.

Having now described and illustrated my invention, what I claim as new and desire to secure by Letters Patent of the United States of America is:

1. A jar ring comprising an annulus of relatively firm rubber having a protruding lip integral therewith, and an insert of relatively soft rubber disposed in said lip in position to intersect the sealing line of the ring when engaged by a jar cover.

2. A jar ring comprising an incomplete annulus of relatively firm rubber, and a segment of relatively soft rubber completing said annulus and providing a protruding lip.

3. A jar ring comprising a flat annulus of relatively firm rubber having an integral lip of similar material, and an insert of relatively soft rubber disposed partly in said lip and extending across the line of seal between the ring and the jar cover.

4. A jar ring comprising a ring of firm rubber having a protruding segment of reduced width therein, and an insert of soft rubber disposed in said ring within the protruding segment and extending across the line of seal.

5. A jar ring comprising a firm rubber ring and an insert of soft rubber disposed in said ring, extending radially across the line of seal between the ring and the jar cover, and protruding beyond the circumference of said ring.

J. NEWTON SMITH.